(12) United States Patent
Yang

(10) Patent No.: US 10,988,599 B2
(45) Date of Patent: Apr. 27, 2021

(54) METHOD OF PRODUCING PLANT BIOMASS-BASED BIOPLASTIC

(71) Applicant: Kaien Yang, Chantilly, VA (US)

(72) Inventor: Kaien Yang, Chantilly, VA (US)

( * ) Notice: Subject to any disclaimer, the term of this patent is extended or adjusted under 35 U.S.C. 154(b) by 0 days.

(21) Appl. No.: 16/788,273

(22) Filed: Feb. 11, 2020

(65) Prior Publication Data

US 2020/0247979 A1 Aug. 6, 2020

Related U.S. Application Data

(63) Continuation-in-part of application No. 16/101,435, filed on Aug. 11, 2018, now abandoned.

(51) Int. Cl.
*C08L 3/04* (2006.01)
*C08J 5/04* (2006.01)

(52) U.S. Cl.
CPC .............. *C08L 3/04* (2013.01); *C08J 5/045* (2013.01); *C08J 2301/02* (2013.01); *C08J 2303/04* (2013.01); *C08L 2201/06* (2013.01); *C08L 2205/16* (2013.01)

(58) Field of Classification Search
None
See application file for complete search history.

(56) References Cited

U.S. PATENT DOCUMENTS

| 5,602,321 A * | 2/1997 | John | A01H 5/10 |
| | | | 435/252.3 |
| 5,653,997 A * | 8/1997 | Renimel | A61K 8/4913 |
| | | | 424/401 |
| 2005/0272836 A1* | 12/2005 | Yaginuma | A23L 29/244 |
| | | | 524/27 |
| 2006/0043629 A1* | 3/2006 | Drzal | C08L 1/14 |
| | | | 264/140 |
| 2007/0219141 A1* | 9/2007 | Jones | A01N 65/00 |
| | | | 514/22 |
| 2008/0167436 A1* | 7/2008 | Schilling | C08H 1/00 |
| | | | 527/300 |
| 2008/0188636 A1* | 8/2008 | Argyropoulos | C08H 8/00 |
| | | | 527/300 |
| 2009/0110654 A1* | 4/2009 | Hagemann | A61L 9/014 |
| | | | 424/76.1 |
| 2010/0279354 A1* | 11/2010 | de Crecy | C12P 7/6463 |
| | | | 435/71.1 |
| 2011/0081691 A1* | 4/2011 | Ohto | C07K 14/415 |
| | | | 435/134 |
| 2011/0165635 A1* | 7/2011 | Copenhaver | C12N 1/12 |
| | | | 435/126 |
| 2012/0247763 A1* | 10/2012 | Rakitsky | C09K 8/487 |
| | | | 166/279 |

FOREIGN PATENT DOCUMENTS

CN 105968862 A * 9/2016

OTHER PUBLICATIONS

Kaien Yang: Part 1—Pumpkin based biodiesel and glycerin, 3M Young Scientist Lab dated Aug. 26, 2016 (Year: 2016).*
Kaien Yang: Part 2: Pumpkin Based Bioplastics, 3M Young Scientist Lab dated Sep. 22, 2016 (Year: 2016).*
Youtube Video https://youtu.be/hWVE-xwoOTM 8/12/16 (Year: 2016).*

* cited by examiner

*Primary Examiner* — Peter A Salamon
(74) *Attorney, Agent, or Firm* — Zhengrong Ma

(57) ABSTRACT

This invention relates to the field of producing bioplastics. Specifically, it relates to a method of producing all key ingredients of bioplastic making from pumpkins and making of bioplastic with these ingredients. More specifically, glycerin and other chemicals are extracted from pumpkin seed oil and mixed with starches that in the pumpkin flesh and then reinforced with pumpkin fibers to make bioplastic. The bioplastic produced with the method as disclosed in this invention possess superior properties in tensile strength and biodegradability compared to bioplastic made with petroleum derived glycerin.

7 Claims, 4 Drawing Sheets

METHOD OF PRODUCING PLANT BIOMASS-BASED BIOPLASTIC

TECHNOLOGY FIELD

A method of producing bioplastic from plant derived biomass such as pumpkins. The method includes separating pumpkin flesh and seeds, extracting organic glycerin and other chemicals from the seeds, and mixing with pumpkin flesh and pumpkin stem fibers to form bioplastics.

TECHNOLOGY BACKGROUND

Plastic and Plastic Waste

Plastic is a carbon-rich raw material consisting of any of a wide range of synthetic or semi-synthetic organic compounds that are malleable and so can be molded into any forms. Most of the plastics produced in the world is made from petrochemicals. In the process of producing plastics, crude oil is first refined into ethane, propane and other intermediates, from which ethylene and propylene are transformed under a high temperatures. In the process, plastic polymers will be formed from these monomers with the presence of catalysts. Because of the natural degradation of plastics takes a very long time, as a result, plastic waste is ubiquitous in every corner of the environment. Moreover, petroleum is a non-renewable commodity. The environmental concern long drove the need for producing biodegradable plastic from a renewable source.

Bioplastics and Biopolymers

In the current art, multiple methods exist to produce bioplastics from renewable biomass such as carbohydrate, protein or polyesters.

Carbohydrate Based Bioplastics

Starch and cellulose are common starting carbohydrates for bioplastics. Starch, when adding with additives, can be processed thermo-plastically. The addition of other biodegradable polyesters can improve its malleability. Starch based bioplastics account approximately half of the bioplastics in the market. Despite its abundance and versatility, significant challenge still exists to increase the physical properties of starch-based composites. Moreover, many starch based plastic shows less favored biodegradability. Cellulose, a structural component in plant cell wall, is a polysaccharide consisting of a linear chain of several hundred to many thousands of $(C_6H_{10}O_5)_n$ units. Cellulose film or paper had a long history of application in various industries. The hydroxyl groups of cellulose can partially or fully react with various reagents to produce cellulose esters which can then be produced into bioplastic. The main disadvantage of cellulose based bioplastic its hydrophilic nature. Very often, the plastic made from cellulose possess low water vapor barrier and have poor process ability. It also has high brittleness, limited long-term stability and poor mechanical properties.

Polyester Polylactic Acid (PLA) Based Bioplastic

Another commonly used plant based raw material is PLA. PLA derived from lactic acid which is a fermented byproduct from dextrose which is in turn derived from many plants, mainly corn. It is a thermoplastic, biodegradable aliphatic polyester having potential for packaging applications. The lactic acid monomers are either directly poly-condensed or undergo ring-opening polymerization of lactide to form PLA pellets. PLA is the first bio-based polymer commercialized on a large scale and replaced high-density polyethylene, low-density polyethylene (LDPE), and polyethylene terephthalate (PETP) as packaging material in certain degree. However, it exhibits inferior impact strength, thermal robustness, and barrier properties.

Problem of the Existing Methods

Despite multiple methods of producing bioplastic, significant hurdles exist in achieving the goal of replacing petroleum-based plastic. First, not all starting organic materials in current methods come from plant sources. The currently available bioplastic still carries heavy carbon footprint. Second, Existing methods produce bioplastics from maize, sugarcane, wheat and other crops. It had been reported that bioplastics had contributed to the global food crisis by taking over large areas of land previously used to grow crops for human consumption. In summary, there is an urgent need for a cost effective method to synthetize biodegradable bioplastic from entire plant source.

Pumpkins as a Source for Bioplastic

Pumpkin is constantly wasted each year, making it an inexpensive feedstock for bioplastics. On average, the U.S. produces 1.9 billion pounds of pumpkin each year, with approximately 80 percent ended up in the landfill, causing greenhouse gas emissions. A reverse logistic solution is possible to collect otherwise wasted pumpkins to a centralized location and offer a commercially viable alternative to petroleum-based plastics. In addition, pumpkins have a composition of carbohydrate and polyester that is favorable to bioplastic production. Last but not least, pumpkin stems contain a great amount of plant fibers that can provide strength reinforcement for bioplastic production.

DETAILED DESCRIPTION

Figure 1:
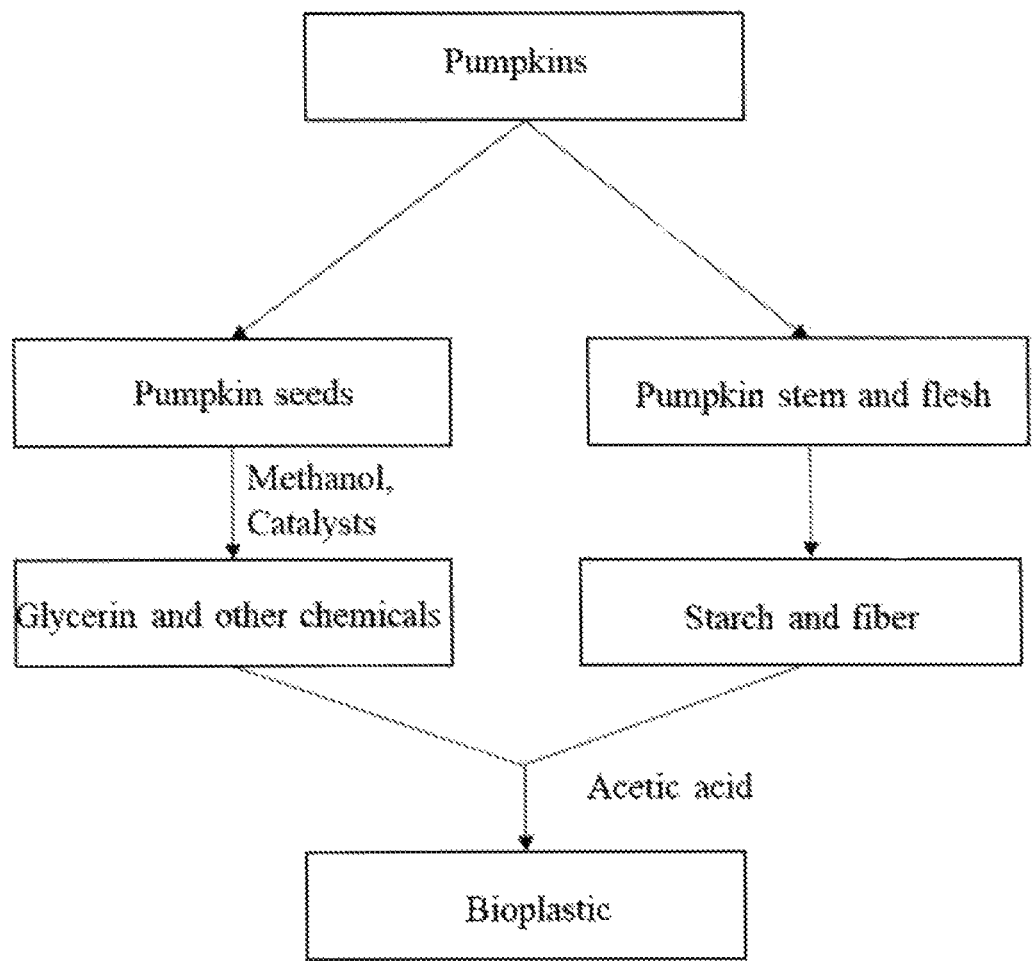
FIG. 1 is a schematic representation showing a method of the producing bioplastic with key components derived from pumpkins.
Figure 2:
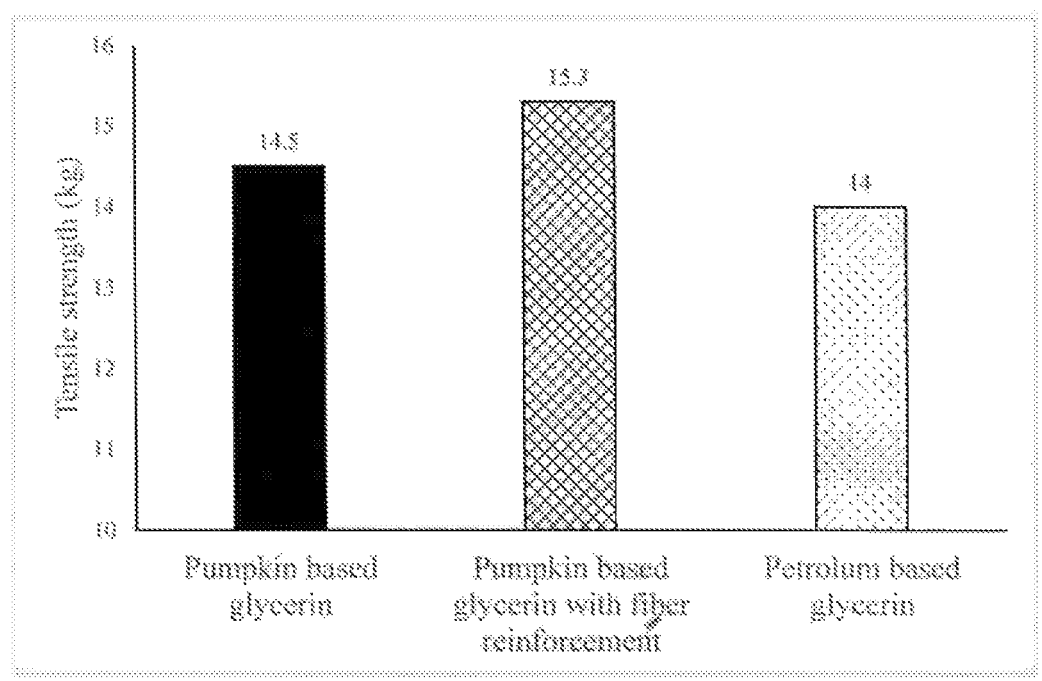
FIG. 2 shows tensile strength comparison result between bioplastics made with pumpkins seed derived glycerin, with and without fiber reinforcement, and petroleum derived glycerin.
Figure 3:
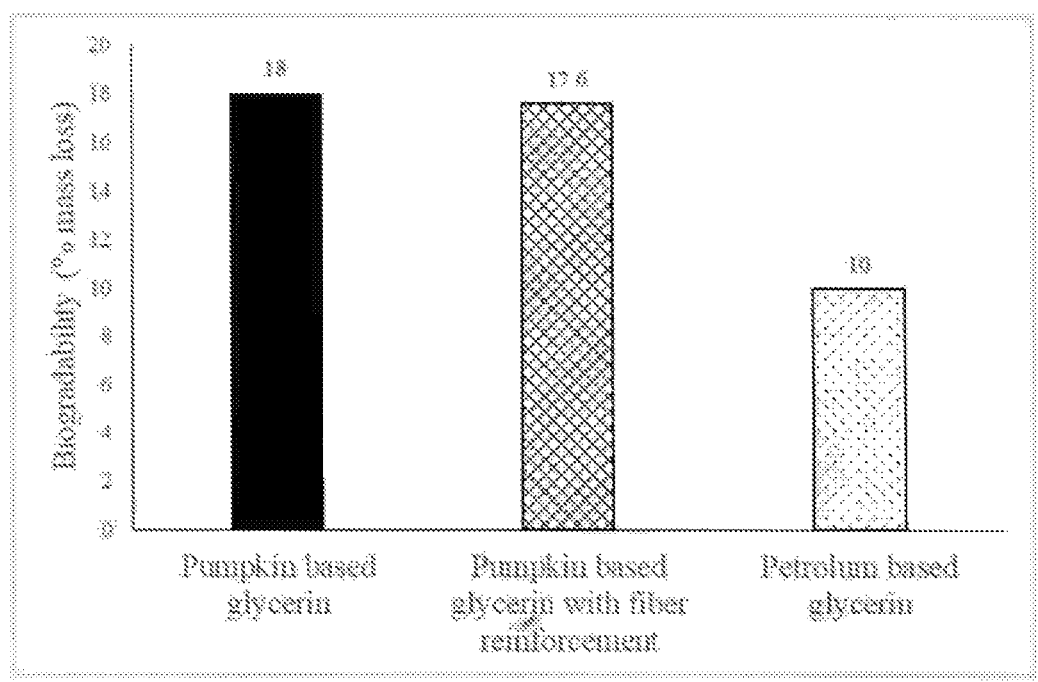
FIG. 3 shows biodegradability comparison result between bioplastics made with pumpkins seed derived glycerin, with and without fiber reinforcement, and petroleum derived glycerin.
Figure 4:
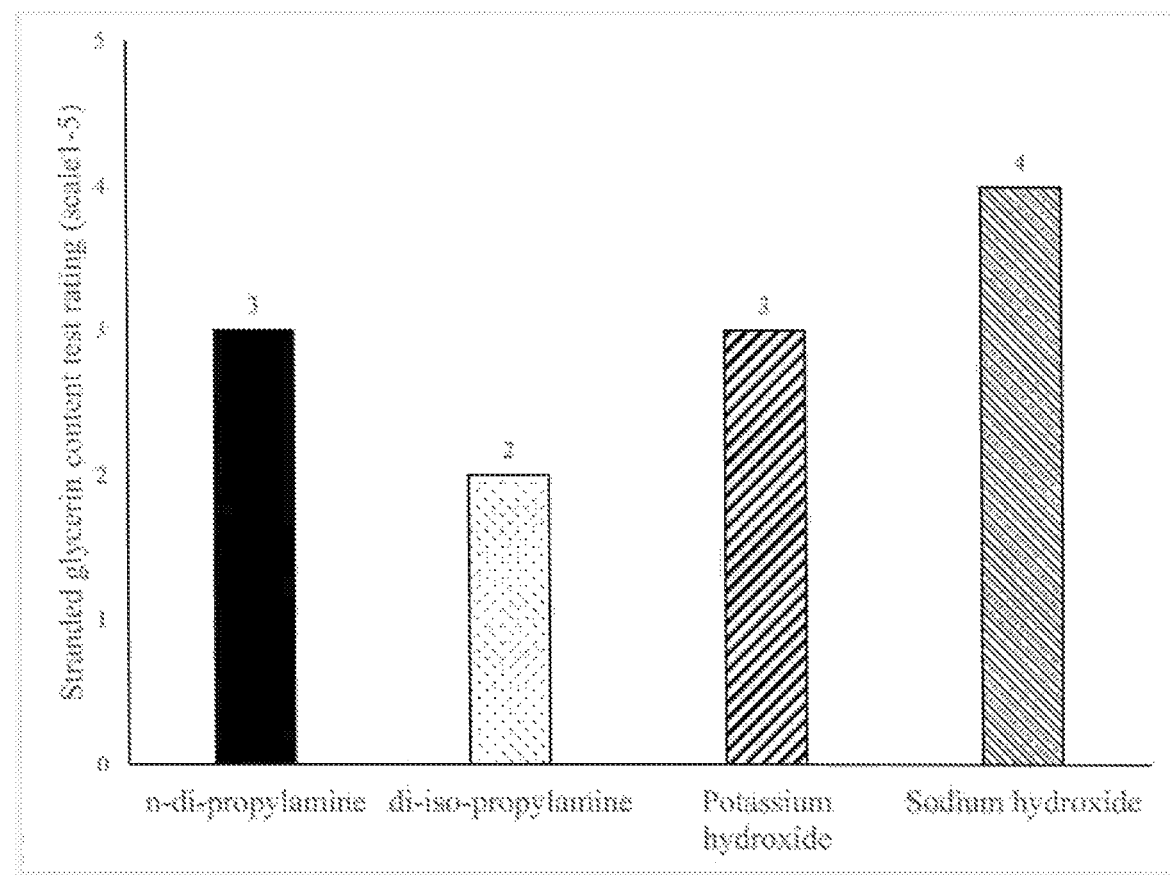
FIG. 4 summaries the comparison of four catalysts used in bioplastic production.

The following disclosure covers the method of producing bioplastic from pumpkins. Specific details of the process are provided in examples for understanding of preferred embodiment.

Mechanical Separation of Pumpkins into Flesh and Seeds

To begin with, pumpkin seeds are separated from pumpkin flesh. The pumpkin flesh is grinded using a kitchen blender until it is a near-homogenous mixture with minimal surface disruptions. An optional step may be applied to remove pumpkin stem and rind from the flesh before grounding. Pumpkin seeds are separately cleaned and dried. The de-shelled seeds are subject to a mechanic extraction apparatus such as an oil extractor for seed oil in a 'cold pressing' way. The pumpkin seeds are crushed inside the machine, and the seed oil is flowing out through the outlet of the machine. The oil is collected after filtration with a stainless steel screen to remove seed shell debris.

The Transesterification Procedure of Making Organic Glycerin

Pumpkin seed oil will be heated to a range between 20° C. and 70° C., such as a temperature about 45° C.-55° C. Appropriate amount of methanol that was purchased from a chemical suppliers, such as between one fifth and two fifths of the pumpkin seed oil by volume, will be measured and dispensed into a glass container. Appropriate catalyst may be added to methanol. In one embodiment, sodium hydroxide, between 1/100 to 1/200 (weight/volume) of methanol, will be added to methanol with gentle shaking until the catalyst completely dissolved in the methanol. The methanol/catalyst mixture will then be mixed into pumpkin seed oil and kept in an environment between 15° C. and 35° C. for fourteen days. Two definitive phases will be formed at the end of 14 days. The top layers is consisting of biodiesel, and the bottom layers includes glycerin and other chemicals.

The top layer will be scooped out with a spoon to leave bottom layer intact. Alternatively, methanol/catalyst mixture in previous step can be transferred into a separating funnel for layer separation to form and then release the bottom layer into a collecting container. The bumpkin seed derived glycerin will be used in bioplastic synthesis in the next step.

Bioplastic Process

Bioplastics, like all plastics, contain at least one polymer and at least one plasticizer. Polymers contain extensive repeating groups of monomers and often feature a long carbon chain. A plasticizer is an additive that increases the pliability or flexibility of the plastic. In the pumpkin-based bioplastic, pumpkin flesh is used as the main polymer because it contains high level of starch which is a repeating units of glucose and other monosaccharides. The primary composition of starch in pumpkin flesh is amylose which is a linear molecule that connects through α(1-4) bound to glucose molecules, and amylopectin, a branched molecule broken at α(1-6) position. When exposed to heat, the amylose and the amylopectin in starch became more organized (linear) due to hydrogen bonding between the hydroxyl groups. This linearization contributes to the stiffness of the bioplastic. The ratio of amylose to amylopectin somewhat determines the bioplastic's flexibility; a higher ratio (more amylose) results in a more rigid bioplastic, whereas a lower ratio (more amylopectin) results in a more flexible bioplastic. Most plant starches contain 20 percent amylose and 80 percent amylopectin.

Glycerin extracted from pumpkin seed oil will be used as a plasticizer because it contained polar hydroxyl groups at 1.51 Debye which absorb water. Acetic acid from common white vinegar will be used to strengthen the bonds between the plasticizer and the polymer. The ions that are present in acetic acid dissociate the polymer, making it readily dissolvable. Other chemicals the present in the pumpkin seed oil that co-extracted with glycerin improved the performance bioplastic end product such as tensile strength and biodegradability.

Reinforcement by Fiber Derived from Pumpkin Stem or Other Plant Parts

Wood flour and fiber are commonly used as strength reinforcement fillers in composite materials. Pumpkin stem is a good source of plant fibers and can be added into pumpkin flesh to add strength. Pumpkin stems are harvested and grinded with the presence of dry ice. The resulted pumpkin stem mash will be treated with strong alkali solution such as 10% to 15% (weight/volume) sodium hydroxide in water at 95° C. for 2 hours. The NaOH treated stem fibers will be recovered by filtering through a filter paper and dried. These fibers will be added into pumpkin flesh for grinding and used in bioplastic formation as described above. In addition, corn stalk pith can be treated in the same method and provide similar reinforcement activity.

Other aspects and advantage of this invention are discussed in the embodiment with reference of drawings.

EMBODIMENT EXAMPLES

An embodiment of this invention is given with reference to description of the drawings.

1,000 grams of dry pumpkin seeds are peeled and feed into the opening end of the chamber of a mechanic oil extractor. The seeds will be crushed and grinded in the oil extractor to extract oil. Extracted oil will be subject to a stainless steel screen (mesh size 100 micron) to remove debris that may be carried over from the shells and seed parts. 200 ml of extracted pumpkin seed oil will be heated to 50° C. 0.4 grams of sodium hydroxide will be added to 44 mL of methanol that was purchased from a chemical supplier and mixed gently until it is fully dissolved. The NaOH/methanol mixture is then added to the pumpkin seed oil in 50° C. with gentle shaking. The mixing bottle was left alone at 25° C. for fourteen days until two definitive layers of glycerin and biodiesel was observed. The top layers is consisting of biodiesel, and the bottom layers includes glycerin and other chemicals.

As one method to recover glycerin, the top layers can be scooped out with a spoon. Alternatively, the oil/methanol mixture will be transferred into a glass separating funnel in standing position for the layer separation to form. Glycerin in the bottom will be released into a collecting glass container by switching open the funnel tap. The pumpkin seed derived glycerin will be used in bioplastic synthesis in the next step. Typically, 30-55 ml glycerin will be recovered.

50 grams of pumpkin vine stem will be harvested with the spiky and waxy layers removed. The rest of the stem will be chopped into 1 centimeter long pieces and transferred to a styroform container with approximately 10 grams of dry ice for 30 minutes. The forzen stem chips with additional small amount of dry ice will be transferred into an electrionic coffee grinder. The grinding setting of the coffee grinder will be set at the most coarse level. Grind the stem material each time for 5 seconds until the stems is transformed into coarse fine chips. These chips will then be transferred into a 10 ounce ceramic mortar to further grind into a mash like consistency with a pestle.

The plant fiber mash will be washed with deionized water into a glass bicker. 100 ml 15% NaOH solutions will be added. Put the bicker on a magnetic stirrer heating plate that is set at 95° C. and stir the solution using a magnetic stirring bar for 4 hours. After the mixture is cooled down to room temperature, the mixture will be passed through a Whatman Grade 2 filter paper. Discard the flow through solution and dry the remaining in an oven at 65° C. until they are fully dried.

Fully dried chemical-treated pumpkin stem powders will be added into pumpkin flesh that is to be used in bioplastic production. More specifically, 100 grams of pumpkin flesh with rind removed are grinded using a kitchen blender until it is a near-homogenous mixture. For each 100 grams of pumpkin flesh, 5 gram pumpkin stem powder will be added. 65 mL of the pumpkin mixture will be poured into a glass container. 10 mL of glycerin that is made with pumpkin seeds and 10 mL of acetic acid (5% concentration) from distilled white vinegar will also be poured into pumpkin mixture and heated to 93° C. Finally, 120 mL of deionized water will be added and the mixture will be kept at 93° C. for 10 minutes. Afterwards, the content will be poured into a tray to a designed thickness and left to cool at room temperature. In one example, 100 ml of mixture will be poured into a 12×12 inch tray and bioplastic film is formed in the process. For every 11 hours, the bioplastic can be lightly heated to speed up the drying process.

After harvested from the tray, the bioplastic film is undergone a series of testing for its strength and biodegradability to compare with plastic made with petroleum derived glycerin that is purchase from a chemical supplier.

Bioplastic Strength Test and Result

The testing apparatus was made with the plastic samples sandwiched between two strips of wood and secured with two clamps. The wood was rested on two elevated platforms. An S-hook was latched onto the opening of the resting clamp, and to a chain underneath the clamp. The chain connected the handle of the bucket and the S-hook. A container was used to pour gravel in the suspended bucket until the bioplastic ripped. The weight that breaks the plastic was recorded, and the test was repeated for the different plastics. The result suggests that bioplastic, with tensile strength of 14.5 kg, outperformed petroleum-based glycerin, and tensile strength of 14 kg. And, more importantly, the bioplastics that is reinforced with fibers provided the highest level of tensile strength of 15.3 kg.

Bioplastic Biodegradability Test

In a plastic container that functioned as a composter, layers of garden soil and other compost materials were prepared to simulate plastic natural degradation environment for plastics. There are two layers of composts; a brown layer that is comprised of carbon-rich items including dry fall leaves, sticks, and bark, and a green layer was made of the green materials that were damp and high in nitrogen. For green layers, damp summer leaves, unprocessed organic fruits, and unprocessed organic vegetables were used.

Ten small, equally spaced, ⅜-inch diameter holes were drilled on the bottom of the composter to serve as air passages. A tray was placed along the length of the box on the ground. This was where the composter was stationed. The composter was not in direct sunlight. Two 8-cm wood planks were evenly spaced and positioned on the tray. The composter rested on the wood.

The weight of the 5 cm×5 cm×0.2 cm bioplastic sheet was measured and recorded. A string with two times the length of the box was tied to the bioplastic. The other end of string was tied to a piece of paper with the bioplastic ID labeled on it.

The box was filled with alternating layers of brown materials (dried and carbon-rich), soil, and green materials (damp and nitrogen-rich). Near the middle of the box, in a soil section, the bioplastics were placed with the ID label outside the box. The box was filled of repeating layers until the top. The composter was placed on the 8 cm wooden planks on top of the tray.

For aeration, the composter was mixed every second day. The compost process continued for 21 days, at the end of which the bioplastics were carefully removed and let dry for two days. Excess dirt around the bioplastic was removed. The bioplastic was weighed and recorded. Using the final and initial weights of the bioplastic, the percent mass decrease was calculated using the following formula: Percent mass loss=(initial mass−final mass)/final*100.

In general, higher pumpkin and glycerin content yielded higher biodegradability. The percent mass loss of petroleum based plastic is only 10%, while, that of pumpkins based bioplastic, with or without fiber addition, is approximately 18%.

What claimed is:

1. A method for producing a pumpkin based bioplastic, the method comprising: providing a pumpkin, the pumpkin comprising pumpkin flesh and pumpkin seeds; providing reinforcing fibers selected from the group consisting of pumpkin stem derived fibers and corn stalk pith fibers; separating the pumpkin flesh from the pumpkin seeds; extracting oil from the pumpkin seeds; separating organic glycerin from the oil; combining the organic glycerin, the pumpkin flesh and the reinforcing fibers to produce a pumpkin based bioplastic.

2. The method of claim 1, wherein separating organic glycerin comprises a transesterification reaction of the combined mixture of pumpkin seed oil, methanol and a catalyst followed by separation of the organic glycerin from the oil.

3. The method of claim 1, wherein the reinforcing fibers are pumpkin stem derived fibers.

4. The method of claim 1, wherein the reinforcing fibers are corn stalk pith derived fibers.

5. The method of claim 2, wherein the catalyst is sodium hydroxide.

6. The method of claim 2, wherein the catalyst is added to the methanol before combining with the pumpkin seed oil.

7. A method for producing a pumpkin based bioplastic, the method comprising: providing a pumpkin, the pumpkin comprising pumpkin flesh and pumpkin seeds; providing reinforcing fibers selected from the group consisting of pumpkin stem derived fibers and corn stalk pith fiber; separating the pumpkin flesh from the pumpkin seeds; extracting oil from the pumpkin seeds; combining the oil with methanol and sodium hydroxide and to produce a mixture; separating organic glycerin from the mixture; combining the organic glycerin, the pumpkin flesh and reinforcing fibers to produce a pumpkin based bioplastic.

* * * * *